United States Patent [19]

Shoji et al.

[11] 4,041,108

[45] Aug. 9, 1977

[54] PROCESS FOR PRODUCING VINYL GRAFT COPOLYMER RESIN

[75] Inventors: Fusaji Shoji; Hiroyoshi Kokaku; Hisashi Kohkame; Koiti Kakefuda, all of Hitachi, Japan

[73] Assignee: Hitachi, Ltd., Japan

[21] Appl. No.: 558,373

[22] Filed: Mar. 14, 1975

[30] Foreign Application Priority Data

Mar. 20, 1974 Japan .................................. 49-30950

[51] Int. Cl.$^2$ ........................................... C08L 33/08
[52] U.S. Cl. .................................... 260/881; 260/884; 260/885
[58] Field of Search ................ 260/881, 884, 885, 886

[56] References Cited

U.S. PATENT DOCUMENTS

| | | | |
|---|---|---|---|
| 3,047,534 | 7/1962 | Dyer et al. | 260/885 |
| 3,370,105 | 2/1968 | De Bell et al. | 260/880 |
| 3,821,329 | 6/1974 | Gallagher | 260/885 |
| 3,825,621 | 7/1974 | Ford | 260/878 R |
| 3,830,878 | 8/1974 | Kato et al. | 260/876 R |
| 3,875,259 | 4/1975 | Yoshida et al. | 260/876 R |
| 3,929,933 | 12/1975 | Gallagher | 260/876 |
| 3,944,630 | 3/1976 | Ide et al. | 260/885 |

Primary Examiner—Carman J. Seccuro
Attorney, Agent, or Firm—Craig & Antonelli

[57] ABSTRACT

A process for producing a high impact thermoplastic resin by graft polymerization of an acrylic rubber and a polymerizable vinyl monomer which comprises agglomerating acrylic rubber particles by stirring a mixture of the acrylic rubber latex and the polymerizable vinyl monomer in the presence of a coagulating agent, the particle size of the acrylic rubber particle agglomerate being adjusted to a range of 0.2 to 10 $\mu$, initiating graft polymerization in the presence of a free radical initiator, adding a surface active agent during the polymerization, continuing the polymerization until demulsification occurs while the particle size of the agglomerate of the acrylic rubber particles and grafted acrylic rubber particles is adjusted to a range of 0.2 to 10 $\mu$, and then completing the graft polymerization by suspension polymerization method. The process can give a vinyl graft copolymer resin having high gloss and excellent weather resistance without impairing its impact resistance.

19 Claims, No Drawings

PROCESS FOR PRODUCING VINYL GRAFT COPOLYMER RESIN

The present invention relates to a process for producing a vinyl graft copolymer resin. More particularly, the invention pertains to a process for producing a high impact thermoplastic resin having high gloss and weather resistance by graft polymerization of an acrylic rubber and a polymerizable vinyl monomer.

In order to improve the impact resistance of vinyl polymers such as polystyrene or methyl methacrylate, a method which comprises graft polymerizing a vinyl monomer such as styrene or methyl methacrylate onto a rubber polymer such as polybutadiene or acrylic rubbers has heretofore been employed. High impact polystyrene, acrylonitrile-butadiene rubber-styrene copolymers (ABS resins), methyl methacrylate-butadiene rubber-styrene copolymers (MBS resins), acrylonitrilebutyl acrylate rubber-styrene copolymers or acrylic rubber-styrene copolymers are provided according to this method. As a graft polymerization method for obtaining these thermoplastic resins, (a) a method which comprises adding a vinyl monomer to a rubbery polymer latex, subjecting the mixture to homogeneous mixing, and then graft polymerizing the mixture by emulsion polymerization method, and (b) a method which comprises dissolving a rubbery polymer in a vinyl monomer, subjecting the mixture to partial polymerization, effecting phase inversion, adding an aqueous medium, and then completing graft polymerization in a suspension system are known. However, these methods have defects as mentioned below.

In the former method (a), the particle size of the rubbery polymer obtained by emulsion polymerization can be freely controlled at the emulsion polymerization stage, but the particle size is generally distibuted within a range of 0.05 to 0.3 μ. As a result of studies, the present inventors have found that an improvement in the mechanical properties, and particularly impact resistance, of the desired resin is badly influenced if the particle size of the rubbery polymer is 0.3 μ or less.

On the other hand, in the latter method (b), stirring speed must be controlled so that phase inversion may occur when a rubbery polymer is dissolved in a vinyl monomer, the solution is subjected to partial polymerization with stirring, and the vinyl monomer is graft copolymerized onto the rubbery polymer at a conversion of 10 to 45%. The stirring speed is very important in such a production method. The particle size of the rubbery polymer produced as a result of phase inversion varies remarkably according to the stirring speed and the mechanical properties and gloss of the desired resin is badly influenced. Therefore, thorough attention must be paid to stirring operation and the operation becomes very troublesome.

An object of the present invention is to provide a vinyl graft copolymer resin which has been improved in both impact resistance and gloss which are contrary to each other in vinyl graft copolymer resins reinforced with an acrylic rubber.

Another object of the invention is to provide a vinyl graft copolymer resin which has been improved in weather resistance in addition to impact resistance and gloss.

These and other objects and advantages of the invention will be apparent from the following description of the invention.

The present invention provides a process for producing a vinyl graft copolymer resin by graft polymerization of an acrylic rubber and a polymerizable vinyl monomer characterized by agglomerating acrylic rubber particles by stirring a mixture of 5 – 50 parts by weight (solid rubber basis) of an aqueous latex of the acrylic rubber and 95 – 50 parts by weight of the vinyl monomer consisting essentially of a polymerizable aromatic vinyl monomer in the presence of a coagulating agent, the particle size of the resulting agglomerate being adjusted to a range of 0.2 to 10 μ, initiating graft polymerization of the polymerizable mixture in the presence of a free radical initiator, adding a surface active agent during the polymerization, continuing the polymerization until demulsification occurs while the particle size of the agglomerate of said acrylic rubber particles and grafted acrylic rubber articles is adjusted to a range of 0.2 to 10 μ, and then completing the graft polymerization by suspension polymerization method.

According to the present invention, impact resistance can be improved by agglomerating rubber particles in a latex of a rubbery polymer, that is, an acrylic rubber latex by the addition of a coagulating agent so that the particle size of the rubber particle agglomerate may be adjusted to a range of 0.2 to 10 μ, and reduction in surface gloss can be prevented by adjusting the particle size of the graft prepolymer (which is mostly a rubbery phase) equally to a range of 0.2 to 10 μ by the addition of a surface active agent during the graft polymerization.

As a coagulating agent for aggregating rubber particles in the acrylic rubber latex which is one characteristic of the present invention, various water-soluble compounds capable of aggregating or fusing dispersed particles in the latex, that is, acrylic rubber particles may be used. For example, sodium chloride, sodium sulfate, sodium bromide, potassium chloride, potassium sulfate, potassium bromide, calcium chloride, magnesium sulfate, magnesium chloride, magnesium phosphate, disodium phosphate, monopotassium phosphate, calcium phosphate, potassium alum, sodium carbonate, potassium carbonate, calcium carbonate, hydrochloric acid, sulfuric acid, phosphoric acid, ammonium chloride, ammonium sulfate, ammonium phosphate, sodium hydroxide, potassium hydroxide, ammonium hydroxide, acetic acid, sodium acetate, potassium acetate, magnesium acetate, calcium acetate, ammonium acetate, formaldehyde sodium sulfoxylate, formaldehyde zinc sulfoxylate, polyvinyl alcohol, carboxymethyl cellulose, hydroxymethyl cellulose, polyacrylic acid, sodium polyacrylate, aluminum sulfate and water-soluble alcohols may be used. Of course, any compounds capable of aggregating rubber particles other than these compounds are useful. At least one of the above-mentioned coagulating agents may be used. The amount of the coagulating agents used is suitably selected according to the kind of the coagulating agent, the concentration of the acrylic rubber latex or the absolute amount of the acrylic rubber and is not subject particularly to restriction. It is important to agglomerate the acrylic rubber particles so that the particle size of the resulting agglomerate may be adjusted to a range of 0.2 to 10 μ. It is possible to set up a standard in terms of the absolute amount. Thus, 0.01 to 5 parts by weight by the coagulating agents may be used for 100 parts by weight of a mixture of the acrylic rubber and the vinyl monomer, but the present invention is not limited thereto.

The reason why the particle size of the rubber particle agglomerate in the acrylic rubber latex is adjusted to a range of 0.2 to 10 μ is to obtain both impact resistance and surface gloss. A more preferable range is 0.5 to 7 μ and a still more preferable one is 1.5 to 5 μ. These ranges give a resin having both impact resistance and surface gloss.

Another characteristic of the present invention is that the fusing (aggregation) of the acrylic rubber particles and grafted acrylic rubber particles at their interface is suppressed by adding a surface active agent during the graft polymerization. As the surface active agent which may be used in the present invention, anionic surface active agents such as, for example, sodium alkylbenzenesulfonate, sodium salts of higher alcohol sulfate esters and sodium salts or potassium salts of higher fatty acids such as stearic acid or oleic acid are effective. Thus, all the emulsifiers heretofore used in emulsion polymerization are useful. Also, cationic and nonionic surface active agents are effective. At least one of these surface active agents may be used. Among them, anionic surface active agents are particularly preferable in that they do not obstruct demulsification at the latter stage of graft polymerization. In the case of the other surface active agents, one must take care not to use the agents in an excessive amount. The amount of the surface active agents added may be determined so that the fusing (aggregation) of the agglomerates of the acrylic rubber particles and grafted acrylic rubber particles may be suppressed and the particle size of the agglomerates may be always within a range of 0.2 to 10 μ, and preferably 0.5 to 7 μ, and more preferably 1.5 to 5 μ. The amount added varies according to the concentration (content) of the acrylic rubber particles, but it is possible to set up a standard in terms of, for example, the total weight of the acrylic rubber particles and the vinyl monomer. In general, when the amount of the acrylic rubber particles (rubber solid basis) is 5 to 50 parts by weight and the amount of the vinyl monomer is 95 – 50 parts by weight and thereby the total weight is 100 parts by weight, the surface active agents may be added in an amount of 0.5 to 5 parts by weight. If the amount added is less than 0.5 part by weight, the effect of addition can substantially not be obtained. On the other hand, if the amount added is more than 5 parts by weight, there is the possibility that the acrylic rubber particle agglomerate is broken and the particle size of the agglomerate becomes less than 0.2 μ. It is preferable to add the surface active agent at a conversion of 5 –60%, and particularly 10 –40%, since the fusing of the agglomerates of the acrylic rubber particles and grafted acrylic rubber particles is easiest to occur at this time point. If it is necessary to add the surface active agent two or more times to suppress aggregation, the second or subsequent additions may be carried out at any intervals until the conversion reaches 60%. Thus, the aggregation (fusing) of the agglomerates of the acrylic rubber particles and grafted acrylic rubber particles can be surely prevented by two or more additions. The amount added each time may be the same as or lower than the above-mentioned amount added.

The acrylic rubber latex used in the present invention is a cross-linked acrylic rubber latex obtained by subjecting an acrylic acid ester represented by the general formula, $$CH_2 = CH - COOR$$

wherein R is an alkyl group having 2 to 8 carbon atoms, to emulsion polymerization in the presence of a cross-linking agent, that is, at least one member selected from vinyl monomers having at least two unsaturations such as, for example, triallyl isocyanurate, triallyl cyanurate, triacryl formal, ethylene glycol dimethacrylate and divinylbenzene and oligomers represented by the general formula,

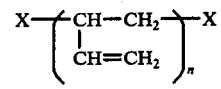

wherein X is hydrogen, $CH_2CH_2OH$ or COOH and n is a mean degree of polymerization and is 10 to 100, using a polymerization catalyst such as a persulfate, for example, potassium persulfate, sodium persulfate or ammonium persulfate or a redox catalyst, that is, a combination of at least one oxidizing agent selected from persulfates, hydrogen peroxide, cumene hydroperoxide, diisopropylbenzene hydroperoxide, tert-butyl hydroperoxide, di-tert-butyl peroxide, p-menthane hydroperoxide, benzoyl peroxide, lauroyl peroxide, methyl ethyl ketone peroxide and dicumyl peroxide and at least one reducing agent selected from inorganic reducing agents such as, for example, ferrous salts and $NaHSO_3$ and organic reducing agents such as, for example, alcohol compounds and amine compounds, specifically, for example, a combination of hydrogen peroxide and ferrous sulfate, a combination of potassium persulfate and a ferrous salt or a combination of one of the above-mentioned organic peroxides and a formaldehyde sulfoxylate salt.

The vinyl monomer to be copolymerized with the above-mentioned acrylic acid ester may be generally used in an amount of 0.1 to 2 parts by weight per 100 parts by weight of the acrylic acid ester. The rubber content of the acrylic rubber latex may be 70% by weight or less, and usually within a range of 20 to 40% by weight.

The vinyl monomer to be graft-copolymerized onto the acrylic rubber may be at least one of aromatic vinyl monomers such as, for example, styrene, α-methylstyrene, vinyltoluene, p-tert-butylstyrene, and chlorostyrene. However, it is possible to use together with the aromatic vinyl monomers at least one aliphatic vinyl monomer such as, for example, a methacrylic acid ester, acrylonitrile, methacrylonitrile, an acrylic acid ester, acrylic acid, methacrylic acid and acrylamide in an amount of 50% by weight based on the total weight of the vinyl monomers. Particularly, in order to improve impact strength, tensile strength and heat distortion temperature, it is preferable to use such aliphatic vinyl monomers in an amount of 15 to 50% by weight together with the aromatic vinyl monomers. If more than 50% by weight of the aliphatic vinyl monomers are added, there is the possibility that the processability of the final resin is deteriorated.

The compounding ratio of the acrylic rubber (rubber solid basis) to the vinyl monomer is not particularly limited. In the case of engineering plastics, the compounding ratio is usually suitably 95 to 50 parts by weight of the vinyl monomer for 5 to 50 parts by weight of the acrylic rubber, and particularly 95 to 75 parts by weight of the former for 5 to 25 parts by weight of the latter. However, in special cases such as when a high impact resin is to be synthesized, any compounding ratio beyond the above-mentioned range may be used.

In the practice of the present invention, as a free radical initiator (polymerization initiator) used in graft polymerization reaction ones already known may be used. For example, persulfates such as potassium persulfate, sodium persulfate and ammonium persulfate; organic hydroperoxides such as cumene hydroperoxide, diisopropylbenzene hydroperoxide, tert-butyl hydroperoxide, and p-menthane hydroperoxide; peroxides such as benzoyl peroxide, lauroyl peroxide, methyl ethyl ketone peroxide, di-tert-butyl peroxide and dicumyl peroxide; azo compounds such as azobisisobutyronitrile; and the same redox catalysts as mentioned above may be used.

An amount of said catalyst used is not particularly limited. The amount may be determined according to previous practice of graft polymerization. Specifically, it is sufficient to use 0.05 to 5 parts by weight of the catalyst for the total weight of the acrylic rubber (solid basis) and the vinyl monomer of 100 parts by weight.

Also, if necessary, a usual chain transferring agent such as, for example, n-dodecylmercaptane and tert-dodecylmercaptane may be used as a molecular weight modifier for the graft chain. An amount of the chain transferring agent added may be 0.5 part by weight or less per 100 parts by weight of the vinyl monomer. If the amount added exceeds 0.5 part by weight, the mechanical properties of the final resin is remarkably deteriorated.

When an acrylic rubber latex, a vinyl monomer and a coagulating agent are mixed in the present invention, stirring during polymerization can be facilitated by adding a surface active agent in an amount of 0.5 part by weight per 100 parts by weight of the vinyl monomer.

The term "demulsification" used herein has the following meaning:

At the beginning of the polymerization reaction, the acrylic rubber particles and the vinyl monomer layer are dispersed in an aqueous phase, but the acrylic rubber particles, the vinyl monomer layer and the vinyl polymer particles formed by the reaction coalesce and are gradually converted into a continuous phase, which is dispersed in the aqueous phase, with the progress of the polymerization. As the reaction further proceeds, the continuous phase expands and the reaction system becomes so viscous as to make stirring difficult. Such a state is demulsification.

In the present invention, the graft polymerization is completed in the suspension system after the demulsification. Therefore, a suspending agent and an aqueous medium are required in this step as in suspension polymerization of prior art. The above-mentioned suspending agent and aqueous medium may be added to the polymerization system between the beginning of the polymerization and the demulsification or may be added after the demulsification. Addition after the demulsification is advantageous in that polymerization speed till the demulsification is comparatively fast and polymerization time can be shortened to about 1 to 3 hours. Alternatively, the suspending agent may be added before the demulsification and the aqueous medium may be added after the demulsification. Also, it is possible to complete the suspension polymerization by adding the aqueous medium before the demulsification and adding the suspending agent after the demulsification.

The amounts of the suspending agent and the aqueous medium used are preferably 0.2 to 10 parts by weight and 50 to 400 parts by weight, respectively, for the total weight of the acrylic rubber (solid basis) and the vinyl monomer of 100 parts by weight. However, if the coagulating agent previously added acts also as a suspending agent, the amount of the suspending agent added should be suitably regulated in consideration of the amount of said coagulating agent added. As the suspending agent, at least one of the suspending agents used in usual suspension polymerization such as natural high polymers such as gelatine, methyl cellulose and carboxy methyl cellulose, polyvinyl alcohol, barium sulfate, calcium sulfate, barium carbonate and magnesium carbonate may be used. As the aqueous medium, water or water containing a small amount (20 % by weight or less) of a solvent having a hydrophilic group such as carboxyl group or hydroxyl group, for example, glycerol, a glycol or an alcohol may be used.

When the acrylic rubber latex, the vinyl monomer and the coagulating agent are mixed and stirred to agglomerate the acrylic rubber particles, the mixture may be stirred at a high speed by the use of, for example, a homomixer to disperse the respective components well. If dispersion is extremely insufficient, there is the possibility that the impact resistance of the final resin is deteriorated. For example, when a homomixer is used, mixing and stirring may be effected at 3000 to 10,000 r.p.m. Of course, stirring speed is not limited thereto. After all, such a means as can disperse the respective components well may be employed.

In the present invention, the temperature of polymerization reaction may be within a range of 30 to 150° C, but the polymerization reaction is usually carried out of 60 to 110° C.

The preparation example of an acrylic rubber latex and the examples of the present invention are described below, but the present invention is not limited to the preparation example and the examples, in which all parts are expressed by weight unless otherwise indicated.

Preparation Example of Acryl Rubber Latex

An aqueous solution and a vinyl monomer solution each having the following compositions were prepared, and were introduced into a glass flask and mixed by a homomixer to form an emulsion:

| "Aqueous solution": | |
|---|---|
| Distilled water | 510 parts |
| High fatty acid sodium salt | 6 parts |
| Sodium persulfate | 0.14 part |
| Na$_2$SO$_3$ | 0.096 part |
| "Vinyl monomer solution": | |
| Butyl acrylate | 246 parts |
| Triallyl isocyanurate | 4.8 parts |

The above-mentioned emulsion was polymerized in a nitrogen gas stream with stirring at 60° C for 6 hours and then at 80° C for 5 hours. After the completion of polymerization, the polymerization product was cooled to obtain an acrylic rubber latex (solid rubber content 32.55 %).

EXAMPLE 1

An aqueous solution and a vinyl momoner solution each having the following compositions were prepared, and were introduced into a three-neck separable flask and stirred by a homomixer for ten minutes:

"Aqueous solution":

-continued

| | |
|---|---|
| Distilled water | 100 parts |
| Formaldehyde sodium sulfoxylate (hereinafter referred to as "Rongalit") | 1.8 parts |
| "Vinyl monomer solution": | |
| Styrene | 360 parts |
| Lauroyl peroxide | 1.8 parts |
| Cumene hydroperoxide | 1.3 parts |

Then, 305 parts of an acrylic rubber latex (solid rubber content 32.55 %) was added during homogeneous mixing at a high speed and mixing was continued for 5 minutes. Further, an aqueous solution obtained by diluting 50 parts of a 5 % aqueous solution of polyvinyl alcohol (trademark KH-20 manufactured by Nippon Synthetic Chemical Industry Co., Ltd.) with 400 parts of distilled water was added. The whole was subjected to homogeneous mixing. The mixed solution was introduced into a separable flask equipped with a stirrer, a reflux condenser, a thermometer and a nitrogen gas inlet tube. Nitrogen gas was then introduced and the contents of the flask were heated to 70° C to start polymerization. One hour after the start of polymerization (conversion 10 to 30 %), an aqueous solution containing 2 parts of a higher fatty acid sodium salt (trademark Nonsaru TN-1 manufactured by Nippon Oils & Fats Co., Ltd.) was added. Five hours after the start of polymerization, 10 parts of a 5 % aqueous solution of polyvinyl alcohol and 500 parts of distilled water were added. After polymerizationn at 70° C for 35 hours, 50 parts of styrene and 24 parts of lauroyl peroxide were added. Polymerization was further continued at 80° C for 2 hours and then at 90° C for 3 hours. After the completion of the reaction, the reaction mixture was filtered, washed with water and dried to obtain a graft copolymer.

EXAMPLE 2

The same aqueous solution and the same vinyl monomer solution as in Example 1 were homogeneously mixed for 10 minutes and 305 parts of an acrylic rubber latex (solid rubber content 32.55 %) and a aqueous solution obtained by dissolving 48 parts of a 5 % aqueous solution of polyvinyl alcohol in 400 parts of distilled water were added. The mixture was subjected to homogeneous mixing for 5 minutes. A solution of 2 parts of the higher fatty acid sodium salt in 100 parts of distilled water was added with mixing homogeneously and the mixing was continued for 5 minutes. Otherwise, the composition and the reaction conditions were the same as in Example 1. Such graft polymerization gave a graft copolymer resin.

EXAMPLE 3

An aqueous solution and a vinyl monomer solution each having the following compositions were prepared, and were introduced into a three-neck separable flask and mixed homogeneously for 10 minutes:

| | |
|---|---|
| "Aqueous solution": | |
| Distilled water | 100 parts |
| Rongalit | 2.1 parts |
| Higher fatty acid sodium salt (Nonsaru TN-1) | 0.2 part |
| "Vinyl monomer solution": | |
| Styrene | 400 parts |
| Lauroyl peroxide | 1.2 parts |
| Cumene hydroperoxide | 1.4 parts |

186.1 Parts of an acrylic rubber latex (solid rubber content 32.68 %) was then added and the mixture was homogeneously mixed for 5 minutes. A solution obtained by dissolving 36 parts of a 5 % aqueous solution of polyvinyl alcohol in 370 parts of distilled water was added and the mixture was further homogeneously mixed for 5 minutes. The mixed solution was then introduced into a separable flask equipped with a stirrer, a reflux condenser, thermometer and a nitrogen gas inlet tube. Nitrogen gas was introduced and the contents of the flask were heated to 70° C to start polymerization. 5 hours after the start of the polymerization, 5 parts of a 5 % aqueous solution of polyvinyl alcohol and 400 parts of distilled water were added. Further, 6 hours after the start of the polymerization, a solution of 20 parts of lauroyl peroxide in 50 parts of styrene was added, and the polymerization temperature was increased to 80° C after 30 minutes. The polymerization was continued at this temperature for 1.5 hours. The polymerization was further carried out at 90° C for 3 hours to complete it. After the completion of the polymerization, the reaction mixture was filtered, washed with water and dried to obtain a graft copolymer.

EXAMPLES 4 –6

Graft polymerizations were carried out using the same composition, the same components and the same reaction conditions as in Example 3 except that the amount of a 5 % aqueous solution of polyvinyl alcohol used was 48 parts, 72 parts and 120 parts, respectively. Thus, a graft copolymer was obtained in each case.

EXAMPLE 7

An aqueous solution and a vinyl monomer solution each having the following compositions were prepared, and were introduced into a three-neck separable flask and mixed homogeneously for 10 minutes:

| | |
|---|---|
| "Aqueous solution": | |
| Distilled water | 100 parts |
| Rongalit | 2.1 parts |
| "Vinyl monomer solution": | |
| Styrene | 400 parts |
| Lauroyl peroxide | 2.0 parts |
| Cumene hydroperoxide | 1.4 parts |

181 Parts of an acrylic rubber latex (solid rubber content 33.4 %) was then added with mixing homogeneously at a high speed and mixing was continued for 5 minutes. Further, a solution obtained by diluting 48 parts of a 5 % aqueous solution of polyvinyl alcohol with 370 parts of distilled water was added and homogeneous mixing was effected for 5 minutes. An aqueous solution containing 2.2 parts of a higher fatty acid sodium salt (Nonsaru TN-1) was added and homogeneous mixing was effected. The mixed solution was then introduced into a separable flask equipped with a stirrer, a reflux condenser, a thermometer and a nitrogen gas inlet tube. Further, nitrogen gas was introduced and the contents of the flask were heated to 70° C to start polymerization. One hour after the start of polymerization (conversion 10 to 30 %), an aqueous solution containing 2.2 parts of the higher fatty acid sodium salt (Nonsaru TN-1) was added, and an aqueous solution containing 2.2 parts of the higher fatty acid sodium salt was further added after one hour (conversion 35 to 55 %). 3.5 Hours after the start of polymerization, 5 parts of a 5 % aqueous solution of polyvinyl alcohol and 300 parts of distilled water were added as demulsification occurred. After polymerization at 70° C for 5.5 hours, 43 parts of styrene and 0.7 part of lauroyl peroxide were added. Polymerization was continued at 80° C for 2 hours and then at 90° C for 3 hours. After the completion of the reaction, the reaction mixture was filtered, washed with water and dried to obtain a graft copolymer.

EXAMPLE 8

Graft polymerization was effected using the same composition, the same components and the same polymerization conditions as in Example 7 except that 2.0 parts of lauroyl peroxide was omitted in the vinyl monomer solution. Thus, a graft copolymer was obtained.

EXAMPLE 9

Graft polymerization was effected using the same composition, the same components and the same polymerization conditions as in Example 7 except that the amount of rongalit added to the aqueous solution was 3.24 parts and the amount of cumene hydroperoxide added to the viny monomer solution was 2.16 parts and 2.0 parts of lauroyl peroxide was omitted in the vinyl monomer solution. Thus, a graft copolymer was obtained.

EXAMPLE 10

Graft polymerization was effected using the same composition, the same components and the same polymerization conditions as in Example 7 except that the amount of rongalit added to the aqueous solution was 6.48 parts and the amount of cumene hydroperoxide added to the vinyl monomer solution was 4.32 parts and 2.0 parts of lauroyl peroxide was omitted in the vinyl monomer solution. Thus, a graft copolymer was obtained.

EXAMPLE 11

Graft polymerization was effected using the same composition, the same components and the same polymerization conditions as in Example 7 except that the amount of rongalit added to the aqueous solution was 2.8 parts. Thus, a graft copolymer was obtained.

EXAMPLE 12

An aqueous solution and a vinyl monomer solution each having the following compositions were prepared, and were introduced into a three-neck separable flask and mixed homogeneously for 30 minutes:

| | |
|---|---|
| "Aqueous solution": | |
| Distilled water | 622 parts |
| 5 % Aqueous solution of polyvinyl alcohol | 49 parts |
| Rongalit | 2.2 parts |
| "Vinyl monomer solution": | |
| Styrene | 411 parts |
| Cumene hydroperoxide | 1.4 parts |

217.4 Parts of an acrylic rubber latex (solid rubber content 33.4 %) was then added with mixing homogeneously and the mixing was continued for 60 minutes. The mixed solution was introduced into a separable flask equipped with a stirrer, a reflux condenser, a thermometer and a nitrogen gas inlet tube. Nitrogen gas was then introduced and the contents of the flask were heated to 70° C to start polymerization. One hour after the start of the polymerization, 102 parts of an aqueous solution containing 2.0 parts of a higher fatty acid sodium salt (Nansaru TN-1) was added, and 102 parts of an aqueous solution containing 2.0 parts of the higher fatty acid sodium salt was further added after one hour. 4.5 Hours after the start of the polymerization, 5 parts of a 5 % aqueous solution of polyvinyl alcohol and 300 parts of distilled water were added as demulsification occurred. Polymerization was continued at 70° C for 6 hours, at 80° C for 3 hours and then at 90° C for 3 hours. After the completion of the reaction, the reaction mixture was filtered, washed with water and dried to obtain a graft copolymer.

EXAMPLES 13-14

Graft polymerization were carried out using the same composition, the same components and the same polymerization conditions as in Example 12 except that 0.12 part of tert-dodecylmercaptan and 0.58 part of benzoyl peroxide were further respectively added to the vinyl monomer solution. Thus, a graft copolymer was obtained in both cases.

EXAMPLE 15

Graft polymerization was carried out using the same composition, the same components and the same polymerization conditions in Example 7 except that the addition of 2.2 parts of a higher fatty acid sodium salt (Nonsaru TN-1) during homogeneous mixing on charging of the starting materials and the addition of 2.2 parts of the higher fatty acid sodium salt two hours after the start of polymerization were replaced by the addition of 6.6 parts of the higher fatty acid sodium salt one hour after the start of polymerization. Thus, a graft copolymer was obtained.

EXAMPLE 16

Graft polymerization was carried out using the same composition, the same components and the same polymerization conditions as in Example 7 except that 2.0 parts of lauroyl peroxide was omitted in the vinyl monomer solution and 0.43 part of triacryl formal was further added. Thus, a graft copolymer was obtained.

EXAMPLE 17

The same vinyl monomer solution as used in Example 7 except that 400 parts by styrene was replaced by a mixture of 300 parts of styrene and 100 parts of acrylonitrile and 1.0 part of tert-dodecylmercaptan was used in addition to cumene hydroperoxide was used. This vinyl monomer solution and the same aqueous solution as used in Example 7 were introduced into a three-neck separable flask and mixed homogeneously. The same acrylic rubber latex as used in Example 7 was added and homogeneous mixing was continued. A solution obtained by diluting 50 parts of a 5 % aqueous solution of polyvinyl alcohol with 400 parts of distilled water was then added and homogeneous mixing was carried out for 5 minutes. A solution of 2.2 parts of a higher fatty acid sodium salt in distilled water was then added and homogeneous mixing was carried out for 5 minutes. The mixture solution was introduced into a separable flask equipped with a stirrer, a reflux condenser, a thermometer and a nitrogen gas inlet tube and nitrogen gas then introduced. The contents of the flask was heated to 75° C to start polymerization. One hour after the start of the polymerization (conversion 10 to 30 %), an aqueous solution containing 2.2 parts of the higher fatty acid sodium salt was added. Further, an aqueous solution containing 2.2 parts of the higher fatty acid sodium salt was added after one hour (conversion 35 to 55 %). About 3 to 4 hours after the start of the polymerization, 35 parts of 5 % polyvinyl alcohol and 500 to 1500 parts of distilled water were added to form a suspension polymerization system as demulsification occurred. Polymerization was continued at 75° C for 6 hours, at 80° C for 2 hours, and then at 90° C for 3 hours. After the completion of the reaction, the reaction mixture was filtered, washed with water and dried to obtain a graft copolymer.

EXAMPLE 18

Graft polymerization was carried out using the same composition, the same components and the same reaction conditions as in Example 12 except that 411 parts of styrene used in the vinyl monomer solution was replaced by 300 parts of styrene and 111 parts of acrylonitrile and further 0.82 part of tert-dodecylmercaptan and that the amount of the acrylic rubber latex used was 344.6 parts. Thus, a graft copolymer was obtained.

EXAMPLE 19

An aqueous solution and a vinyl monomer solution each having the following compositions were prepared, and were introduced into a three-neck separable flask and mixed homogeneously for 30 minutes:

| "Aqueous solution": | |
|---|---|
| Distilled water | 685 parts |
| 5 % Aqueous solution of polyvinyl alcohol | 54.2 parts |
| Rongalit | 3.0 parts |
| "Vinyl monomer solution": | |
| Styrene | 339.4 parts |
| Acrylonitrile | 113 parts |
| Cumene hydroperoxide | 1.4 parts |
| Benzoyl peroxide | 2.7 parts |

239 Parts of an acrylic latex (solid rubber content 33.4 %) was added during the homogeneous mixing and the mixing was then continued for 60 minutes. The mixed solution was introduced into a separable flask equipped with a stirrer, a reflux condenser, a thermometer and a nitrogen gas inlet tube, and nitrogen gas was then introduced. The contents of the flask were heated to 70° C to start polymerization. One hour after the start of the polymerization (conversion 10 to 30 %), 102 parts of an aqueous solution containing 2.5 parts of a higher fatty acid sodium salt was added. Further, after one hour (conversion 30 to 60 %) 102 parts of an aqueous solution containing 2.5 parts of the higher fatty acid sodium salt was added. 4.5 Hours after the start of the polymerization, 5 parts of a 5 % aqueous solution of polyvinyl alcohol and 500 parts of distilled water were added as demulsification occurred. Polymerization was continued at 70° C for 6 hours, at 80° C for 3 hours and then at 90° C for 3 hours. After the completion of the reaction, the reaction was filtered, washed with water and dried to obtain a graft copolymer.

The characteristic properties of the graft copolymers obtained in Examples 1 to 19 are shown in the table as described below. These characteristic properties were measured by the use of test pieces prepared by extruding the graft copolymer obtained in each example at a temperature of 220° C by the use of an extruder into pellets and then subjecting the pellets to injection molding. In the table, also, the test results of the example wherein only the coagulating agent (polyvinyl alcohol and rongalit) was omitted in Example 7 (hereinafter referred to as "Comparative Example 1") and the example wherein the coagulating agent and the surface active agent (Nonsaru TN-1) were omitted in Example 7 (hereinafter referred to as "Comparative Example 2") are shown for comparison.

Table

| Item<br>Sample | Izod impact strength (kg.cm/cm$^2$) | Tensile strength (kg.cm/cm$^2$) | Heat distortion temperature (° C) | Surface reflectivity (%) | Flow characteristic (10$^{-3}$ cc/sec) |
|---|---|---|---|---|---|
| Example 1 | 23.2 | 268 | 71 | 45 | 6.1 |
| Example 2 | 15.6 | 271 | 69 | 63 | 5.9 |
| Example 3 | 3.8 | 315 | 73 | 53 | 6.8 |
| Example 4 | 7.5 | 311 | 77 | 41 | 7.1 |
| Example 5 | 6.1 | 313 | 74 | 42 | 6.5 |
| Example 6 | 4.3 | 316 | 75 | 51 | 6.7 |
| Example 7 | 8.9 | 320 | 74 | 80 | 5.6 |
| Example 8 | 9.7 | 317 | 73 | 71 | 3.6 |
| Example 9 | 8.0 | 321 | 72 | 74 | 7.5 |
| Example 10 | 6.5 | 318 | 74 | 79 | 12.8 |
| Example 11 | 10.4 | 321 | 73 | 58 | 3.5 |
| Example 12 | 23.3 | 345 | 70 | 65 | 3.8 |
| Example 13 | 14.9 | 338 | 71 | 74 | 5.7 |
| Example 14 | 15.6 | 329 | 70 | 77 | 6.9 |
| Example 15 | 7.0 | 320 | 74 | 65 | 8.1 |
| Example 16 | 10.4 | 341 | 75 | 78 | 2.0 |
| Example 17 | 16.8 | 431 | 79 | 88 | 5.1 |
| Example 18 | 45.8 | 318 | 67 | 63 | 1.3 |
| Example 19 | 15.2 | 418 | 78 | 75 | 1.8 |
| Comparative Example 1 | 2.1 | 322 | 76 | 80 | 6.5 |
| Example 2 | 1.2 | 320 | 74 | 85 | 6.0 |

In the above-mentioned table, Izod impact strength, tensile strength and heat distortion temperature were measured according to ASTM-D-258, notched, ASTM-D-256-56 and ASTM-D-648-58, respectively. Also, surface reflectivity was measured by the use of a glossmeter manufactured by Murakami Color Technology Research Institute, Japan according to ASTM-D-523. Flow characteristic was shown in terms of the value obtained by extruding a sample through a 1 $\phi$ × 2 mm nozzle under a load of 20 kg at a temperature of 200° C by the use of a Koka-type flow tester.

On the one hand, the weather resistance of the sample of Example 7 was tested by measuring its Izod impact strength (unnotched) after irradiation of ultraviolet ray for a definite time by the use of a sunshine weather meter. The results obtained are as follows:

| | Izod impact strength (kg.cm/cm$^2$) |
|---|---|
| Original value | 80 |
| After 50 hours | 75 |
| After 100 hours | 76 |
| After 250 hours | 50 |
| After 500 hours | 50 |

The above-mentioned characteristics were measured by adding 0.1 % by weight of a stabilizer (Sumilizer BBM), 0.2 % by weight of an ultraviolet absorber (Tinuvin P) and 0.1 % by weight of a lubricant (Sumtight S) to the respective graft copolymer.

What is claimed is:

1. A process for producing a vinyl graft copolymer resin by graft copolymerization of a cross-linked acrylic rubber obtained from an acrylic acid ester having the general formula:

$$CH_2 = CH - COOR$$

wherein R is an alkyl group having 2 – 8 carbon atoms, and a polymerizable vinyl monomer which comprises agglomerating acrylic rubber particles by stirring a mixture of 5 to 50 parts by weight (solid rubber basis) of an aqueous latex of the acrylic rubber and 95 to 50 parts by weight of the vinyl monomer consisting essentially of a polymerizable aromatic vinyl monomer in the presence of a coagulating agent to form an aqueous emulsion, the particle size of the acrylic rubber particle agglomerates being adjusted to a range 0.2 to 10λ, initiating graft polymerization by emulsion polymerization of the acrylic rubber particle agglomerates and the vinyl monomer in the presence of a free radical initiator, adding a surface active agent during the emulsion polymerization, continuing the emulsion polymerization until demulsification occurs while the particle size of the agglomerates of the acrylic rubber particles and grafted acrylic rubber particles is adjusted to a range of 0.2 to 10λ, and then completing the graft polymerization by suspension polymerization.

2. A process as claimed in claim 1, wherein 5 to 25 parts by weight (solid rubber basis) of said acrylic rubber latex and 95 to 75 parts of said polymerizable aromatic vinyl monomer alone are used.

3. A process as claimed in claim 1, wherein said polymerizable vinyl monomer consists of 85 to 50 % by weight of an aromatic vinyl monomer and 15 to 50 % by weight of an aliphatic monomer.

4. A process as claimed in claim 1, wherein the graft polymerization is carried out while the particle size of the agglomerates of the acrylic rubber particles and grafted acrylic rubber particles is adjusted to range of 1.5 to 5 μ.

5. A process as claimed in claim 1, wherein a surface active agent is respectively added at two or more time points of substantially different conversions during the emulsion polymerization until demulsification occurs.

6. A process as claimed in claim 1, wherein a surface active agent is added at least once at a conversion of 5 to 60 % turning point emulsion polymerization.

7. A process as claimed in claim 1, wherein suspension polymerization is carried out by the addition of a suspending agent and an aqueous medium after demulsification.

8. A process as claimed in claim 1, wherein a suspending agent and an aqueous medium are added between the beginning of the emulsion polymerization and demulsification.

9. A process as claimed in claim 1, wherein a suspending agent is added until demulsification occurs and an aqueous medium is added after the demulsification.

10. A process as claimed in claim 1, wherein an aqueous medium is added until demulsification occurs and a suspending agent is added after the demulsification.

11. A process as claimed in claim 1, wherein formaldehyde sodium sulfoxylate is used as said coagulating agent, cumene hydroperoxide is used as said polymerization initiator, and a higher fatty acid sodium salt is used as said surface active agent.

12. A process as claimed in claim 1, wherein said acrylic acid ester is subjected to emulsion polymerization in the presence of a cross-linking agent selected from a group consisting of vinyl monomers having at least 2 unsaturated bonds and oligomers represented by the general formula:

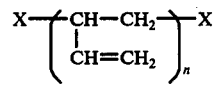

wherein X is hydrogen, $CH_2CH_2OH$ or COOH and n is an integer from 10 to 100, said vinyl monomer being used in an amount of from 0.1 to 2 parts by weight per 100 parts by weight of the acrylic acid ester, whereby said aqueous latex of said acrylic rubber is formed.

13. A process as claimed in claim 1, wherein the acrylic rubber latex has a rubber content within the range of from 20 to 40% by weight.

14. A process as claimed in claim 1, wherein the polymerizable aromatic vinyl monomer is at least one vinyl monomer selected from a group consisting of styrene, α-methyl styrene, vinyl toluene, p-tert-butyl styrene, and chlorostyrene.

15. A process as claimed in claim 1, wherein the coagulating agent is employed in an amount of from 0.01 to 5 parts by weight for 100 parts by weight of a mixture of the acrylic rubber and the vinyl monomer.

16. A process as claimed in claim 15, wherein the amounts of a suspending agent and an aqueous medium used in the suspension polymerization phase are 0.2 to 10 parts of weight and 500 to 400 parts by weight, respectively, for 100 parts by weight of the total weight of the acrylic rubber and the vinyl monomer.

17. A process as claimed in claim 1, wherein the acrylic rubber particles are agglomerated by stirring a mixture of the acrylic rubber latex, the vinyl monomer and the coagulating agent in a homo-mixer operating at 3,000 to 10,000 r.p.m.

18. A process as claimed in claim 1, wherein the temperature of polymerization is within a range of 30 to 150° C.

19. A process as claimed in claim 1, wherein the amount of surface active agent added during the polymerization in the emulsion polymerization phase is in an amount of from 0.5 to 5 parts by weight.

* * * * *